(12) United States Patent
Tan

(10) Patent No.: US 9,517,605 B2
(45) Date of Patent: Dec. 13, 2016

(54) TRI-FOLD PLASTIC BAG ROLL, METHOD AND APPARATUS FOR MAKING SAME

(71) Applicant: Greg Tan, Harahan, LA (US)

(72) Inventor: Greg Tan, Harahan, LA (US)

(*) Notice: Subject to any disclaimer, the term of this patent is extended or adjusted under 35 U.S.C. 154(b) by 0 days.

(21) Appl. No.: 14/466,145

(22) Filed: Aug. 22, 2014

(65) Prior Publication Data
US 2014/0364292 A1    Dec. 11, 2014

Related U.S. Application Data

(63) Continuation of application No. PCT/US2012/049999, filed on Aug. 8, 2012.

(51) Int. Cl.
| | | |
|---|---|---|
| *B31B 19/86* | (2006.01) | |
| *B31B 1/14* | (2006.01) | |
| *B31B 1/26* | (2006.01) | |
| *B31B 1/64* | (2006.01) | |
| *B31B 1/88* | (2006.01) | |
| *B29C 47/00* | (2006.01) | |

(52) U.S. Cl.
CPC . *B31B 1/14* (2013.01); *B31B 1/26* (2013.01); *B31B 1/64* (2013.01); *B31B 1/88* (2013.01); *B29C 47/0021* (2013.01); *B29C 47/0059* (2013.01); *B29K 2023/06* (2013.01); *B31B 2219/2681* (2013.01); *B31B 2219/88* (2013.01); *B31B 2219/923* (2013.01); *B31B 2219/924* (2013.01); *B31B 2237/10* (2013.01); *B31B 2237/60* (2013.01)

(58) Field of Classification Search
CPC ....... B26D 7/025; B26D 7/2614; B31B 19/86; B31B 2219/9093; B31B 2219/30; B65B 9/213; B65B 9/20; B65B 9/2028; B65B 9/2042
See application file for complete search history.

(56) References Cited

U.S. PATENT DOCUMENTS

| | | | |
|---|---|---|---|
| 2,282,126 A | | 5/1942 | Gabbert |
| 2,444,685 A | | 7/1948 | Waters |
| 3,042,103 A | * | 7/1962 | McDevitt et al. ............ 156/466 |
| 3,372,625 A | * | 3/1968 | Simecek et al. ............. 156/251 |
| 3,426,499 A | * | 2/1969 | Paige .............................. 53/451 |
| 3,486,424 A | * | 12/1969 | Tanner .......................... 493/468 |

(Continued)

FOREIGN PATENT DOCUMENTS

EP    0247073 B1    12/1987

*Primary Examiner* — Sameh Tawfik
(74) *Attorney, Agent, or Firm* — David A. Belasco; Belasco Jacobs & Townsley, LLP

(57) ABSTRACT

A plastic or other film bag is formed from a continuous extruded tube. The tube is flattened and sealed across its width at intervals to form bag bottoms. The bags are joined to one another at a perforation line and folded in thirds lengthwise prior to being rolled into a compact roll, either with or without supporting core. After folding the bags may be chisel cut through the center of the perforation line to assist in dispensing of the bags. The chisel cut will extend through all layers of the bag when folded, resulting in three chisel cuts in the bag. The bags may be gusseted for part or as much as all of their width. The bags may also be corona treated and printed on their outer surfaces. The bags may be formed from partially recycled materials and various combinations of linear low density, medium and high density polyethylene.

8 Claims, 10 Drawing Sheets

(56) References Cited

U.S. PATENT DOCUMENTS

| | | | |
|---|---|---|---|
| 3,494,265 A * | 2/1970 | Middour | 493/468 |
| 4,043,098 A * | 8/1977 | Putnam et al. | 53/551 |
| 4,106,260 A | 8/1978 | King | |
| 4,106,395 A | 8/1978 | Rochla | |
| 4,194,438 A * | 3/1980 | Schmachtel | 493/274 |
| 4,532,754 A | 8/1985 | Hokanson | |
| 4,950,345 A * | 8/1990 | Kreager et al. | 156/203 |
| 5,096,305 A | 3/1992 | Rimondi | |
| 5,287,681 A | 2/1994 | Vernon | |
| 5,573,489 A | 11/1996 | Letendre | |
| 5,707,329 A * | 1/1998 | Pool et al. | 493/302 |
| 5,800,329 A | 9/1998 | Fager | |
| 5,816,992 A | 10/1998 | Conrad | |
| 5,890,810 A | 4/1999 | Barlow | |
| 5,967,663 A | 10/1999 | Vaquero | |
| 6,089,753 A | 7/2000 | Belias | |
| 6,135,281 A * | 10/2000 | Simhaee | B65B 43/123 206/390 |
| 6,168,558 B1 | 1/2001 | Vinberg | |
| 6,183,132 B1 | 2/2001 | Simhaee | |
| 6,196,717 B1 | 3/2001 | Belias | |
| 6,254,520 B1 | 7/2001 | Angless | |
| 6,286,680 B1 | 9/2001 | Hofrichter | |
| 6,379,292 B1 | 4/2002 | Simhaee | |
| 6,488,222 B1 * | 12/2002 | West | B65D 33/002 242/160.4 |
| 6,589,147 B2 | 7/2003 | Dominguez | |
| 7,093,978 B2 | 8/2006 | Tan | |
| 7,104,942 B2 | 9/2006 | Tan | |
| 7,611,770 B2 | 11/2009 | Kennedy | |
| 7,794,380 B2 * | 9/2010 | Baker | B31B 19/90 493/212 |
| 7,963,898 B2 * | 6/2011 | Tan | 493/194 |
| 9,050,770 B1 * | 6/2015 | Russell | B31B 23/00 |
| 2002/0020152 A1 * | 2/2002 | Kuhn et al. | 53/551 |
| 2011/0206302 A1 | 8/2011 | Tan | |

* cited by examiner

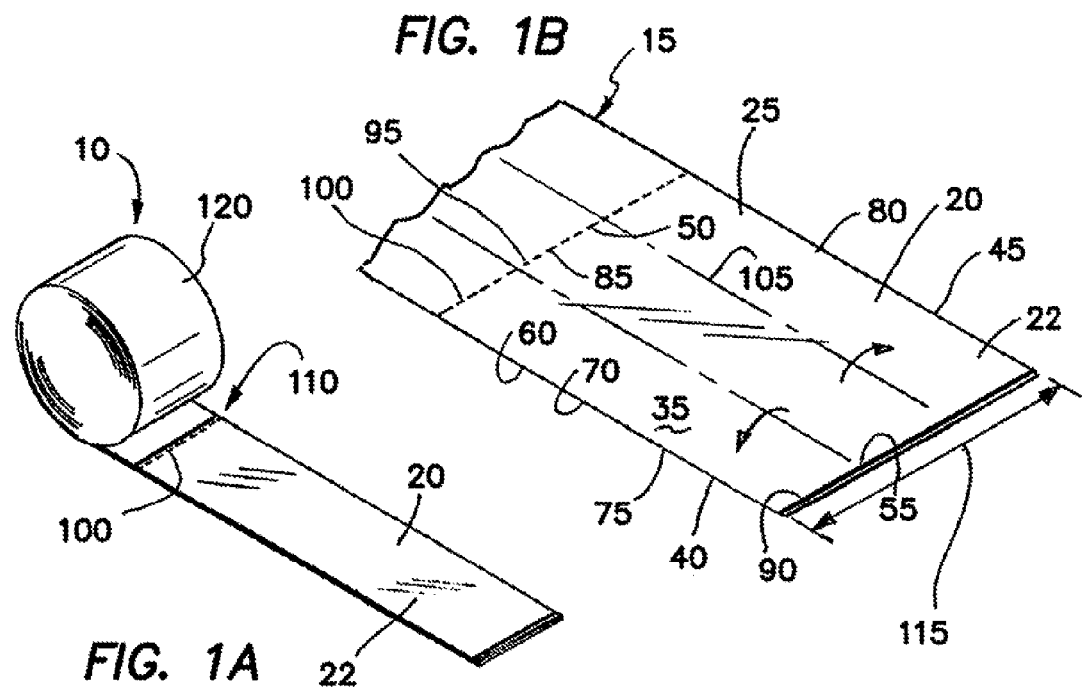
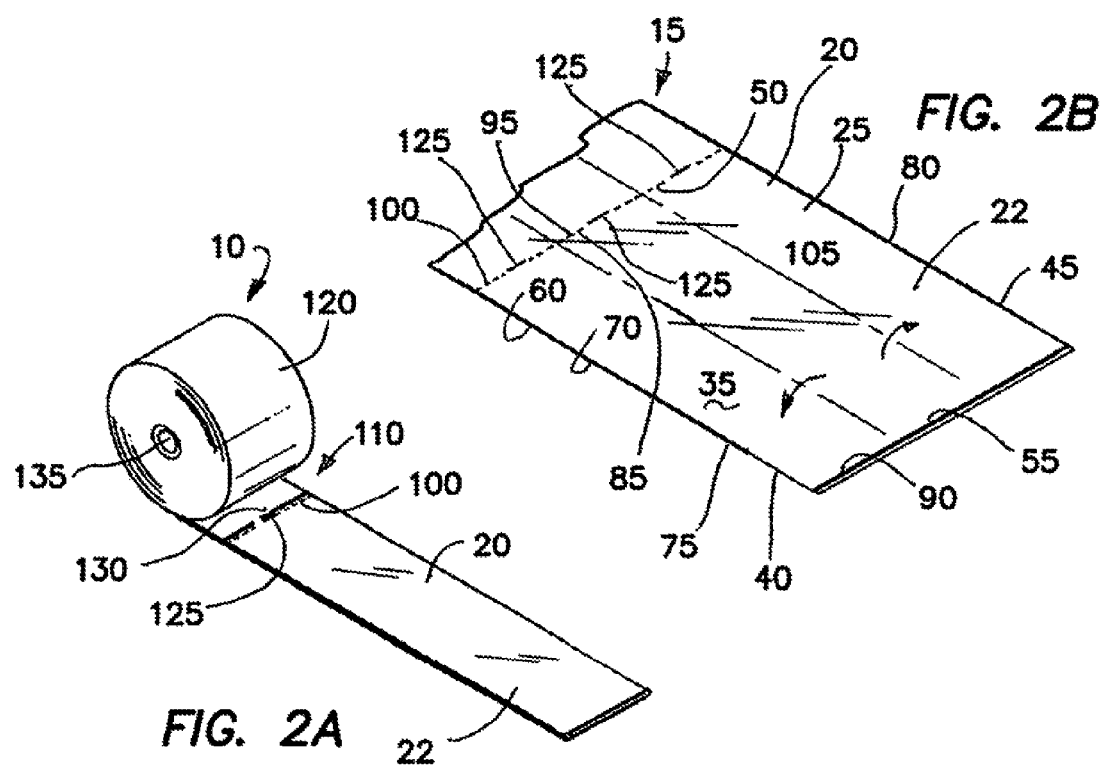

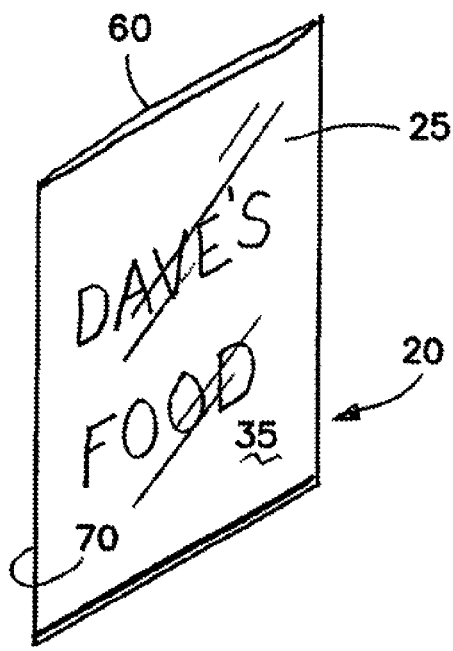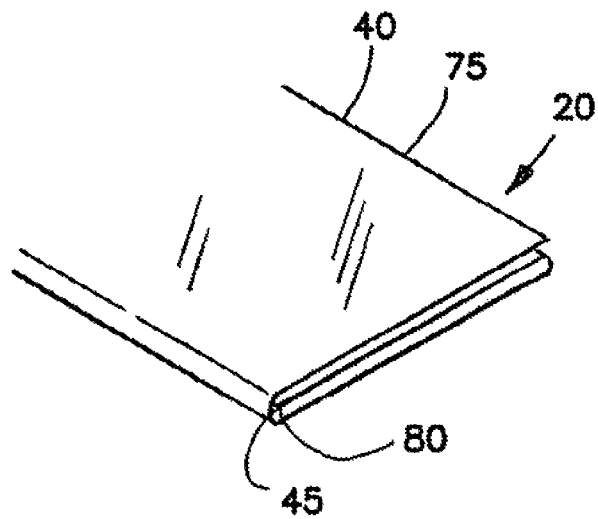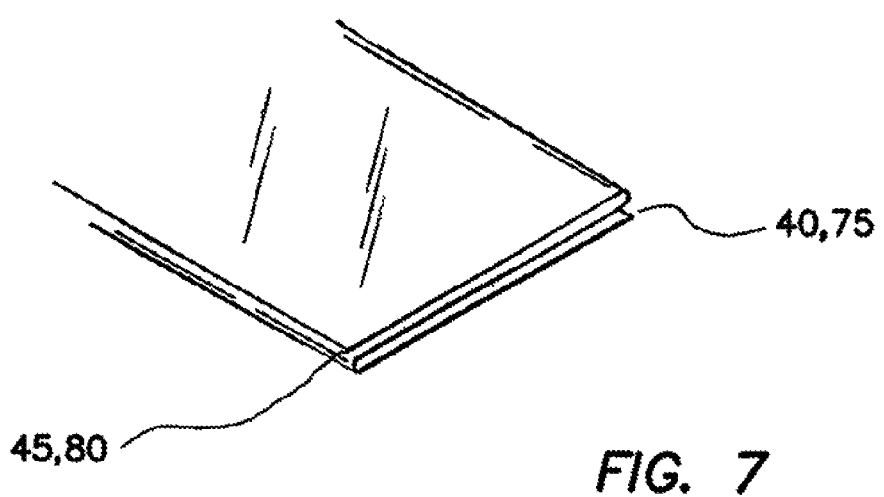

TRI-FOLD PLASTIC BAG ROLL, METHOD AND APPARATUS FOR MAKING SAME

RELATED APPLICATION

This application is a Continuation of PCT/US12/49999, filed Aug. 8, 2012 and currently pending, which is a Continuation-in-Part of pending U.S. application Ser. No. 13/072,630, filed Mar. 25, 2011, which is a Continuation-in-Part of U.S. application Ser. No. 10/847,690, filed May 18, 2004 and incorporates by reference the disclosure of said applications in their entirety.

FIELD OF INVENTION

The invention pertains to plastic and other film bags. More particularly, the invention relates to bags designed for fresh produce that are dispensed from compact rolls and designed to be easily opened.

BACKGROUND OF THE INVENTION

Plastic and other film bags have found wide use in grocery markets and retail applications for transporting produce groceries and various other items. To be most useful for consumers plastic bags should incorporate a number of features. These features relate to the ease of use of the bags with respect to opening them, placing goods inside, carrying them and dispensing them. As shelf space and floor space is always at a premium in grocery stores and supermarkets, more compact methods of storing and making available relatively large size bags is always desirable. The instant invention addresses the production of large size produce bags that are folded in thirds for use in compact rolls. These rolls fit in relatively small dispensers that make use of the available space most efficiently.

A variety of designs have been developed. U.S. Pat. No. 6,196,717, issued to Belias et al., is directed to a method of forming a plurality of easy to open handle bags including the steps of providing a flattened tube of thermoplastic material oriented in a generally longitudinal direction. The flattened tube has a first longitudinal side edge and a second longitudinal side edge, a transverse lower heat seal, and a transverse upper heat seal. The tube also has first, second, and third sections. The second section is disposed between the first and third sections. The first section is joined to the second section along a generally longitudinal first fold line. The second section is joined to the third section along a generally longitudinal second fold line. The second section is cut along a generally transverse first cut line extending between the first and second fold lines. The first section is folded over the second section along the first fold line. The third section is folded over the previously folded-over first section along the second fold line such that the first, second, and third sections overlap one another.

The overlapped first, second, and third sections are cut along a generally longitudinal second cut line that intersects the first cut line, the first fold line, and the second side edge at one end and intersects the upper heat seal at the other end. The overlapped first, second, and third sections are then cut along a generally longitudinal third cut line that intersects the first cut line, the second fold line, and the first side edge at one end and intersects the upper heat seal at the other end.

U.S. Pat. No. 5,890,810, issued to Barlow, discloses an extruded plastics tube that is flattened with the lateral side portions folded to form inwardly extending gussets. Each gusseted side portion is then folded about a longitudinal fold line onto the medial portion between the side portions. The resultant layers are heat sealed to form the bottom of the bag.

U.S. Pat. No. 6,488,222, issued to West et al., describes A folded gusseted plastic bag has a first side gusset formed by first, second, and third longitudinal folds, a second side gusset formed by fourth, fifth, and sixth longitudinal folds, a seventh longitudinal fold being on a side of the bag containing the first, second, and third folds and forming a first folded bag flap, and an eighth longitudinal fold which is on a side of the bag containing the fourth, fifth, and sixth folds, the eighth fold forming a second folded bag flap. The folded gusseted bag also is folded into a total of at least eight contiguous plies. A roll of the folded, gusseted bags includes a continuous web of the folded, flattened bags joined along perforated severance lines. Preferably the perforated severance lines further comprise a centrally-located slit. The dispensing system utilizes the roll of folded-gusseted bags in combination with a dispenser comprising: (i) a support member for attachment to a support surface; (ii) a pair of guide channels carried by the support member for rotatably supporting the roll of plastic bags for rotation of the roll on the core; (iii) a tongue spaced apart from and carried by said support member in a predetermined position corresponding to the predetermined position of the slit in the tear line.

U.S. Pat. No. 6,379,292, issued to Simhaee, illustrates a continuous web of bags formed of a plurality of layers to be separated along a line of perforations that extends through all of the layers transverse of the web, in which at least one of the outermost layers is detached from the web at the separation line. Apparatus accomplishes this detachment in a moving web by engaging the outermost layer outer surface and exerting a force in a manner to produce the detachment from the separation line. Both the outermost upper and lower web layers can be detached at the separation line.

U.S. Pat. No. 5,967,663, issued to Vaquero et al., discloses a thermoplastic bag structure and method for making and packaging thermoplastic bags such that their tops are easily identified and the bags are easily opened. The method for producing these bags begins with cutting a flattened thermoplastic tube into two portions. At least one of the two portions is then collapsed to form a sheet of material having a pair of thermoplastic layers, a straight folded bottom edge and a pair of top edges, at least one of which has a skewed-cut. Bag side structures are formed in the sheet of material at about bag-width distances apart. The bags are then folded a predetermined number of times, in a direction transverse to the bag side structures, so that the skewed-cut top edges of each of the bags remain exposed.

It is an objective of the present invention to provide plastic bags that can be easily stored on and dispensed from a variety of types of compact roll dispensers. It is a further objective to provide bags that can be formed into compact rolls on cores or without cores. It is a still further objective of the invention to provide bags that can be easily manufactured in gusseted or ungusseted form. Finally, it is an objective to provide roll mounted bags that are easily opened after dispensing and that are easily removed from the roll.

While some of the objectives of the present invention are disclosed in the prior art, none of the inventions found include all of the requirements identified.

SUMMARY OF THE INVENTION

The present invention addresses all of the deficiencies of prior art folded film bag inventions and satisfies all of the objectives described above.

(1) A tri-fold film bag providing the desired features may be constructed from the following components. A continuous web of film bags formed from plastic or other film material is provided. Each of the bags includes a front wall. The front wall has an inner surface, an outer surface, first and second side edges, a top edge and a bottom edge. A rear wall is provided. The rear wall has an inner surface, an outer surface, first and second side edges, a top edge and a bottom edge. The front wall is joined to the rear wall at respective first and second side edges thereof. The front wall is sealed to the rear wall adjacent respective bottom edges thereof. An open mouth is located at the top edges of the bag.

The front and rear walls of each of the bags are removably attached by a perforation line at the bottom edges to the top edges of a subsequent bag in the flattened tube. The tube is folded twice parallel to a long axis of the bags to form a compact flattened tube approximately one third of a width of the bags. The folded tube is rolled to form a compact bag roll.

(2) In a variant of the invention, a chisel cut is provided. The chisel cut extends through a center point of the perforation line of the folded tube. When the compact roll is installed in a bag dispenser the chisel cut will engage a separating tongue when bags are pulled from the roll. When the bags are opened to their full width, three chisel cuts will appear at the perforation line.

(3) In a further variant, the compact tube is rolled about a core.

(4) In still a further variant, the bags includes at least one side gusset, the side gusset extending inwardly from either of the first and second side edges of the front and rear walls.

(5) In yet a further variant, the side gusset extends inwardly from either of the first and second side edges of the front and rear walls for up to one third of the width of the bags.

(6) In another variant of the invention, the side gusset extends inwardly from either of the first and second side edges of the front and rear walls for up to one half of the width of the bags.

(7) In still another variant, the outer surface of at least one of the front wall and the rear wall of the bags is corona treated.

(8) In a further variant, the corona treatment of the outer surface of at least one of the front and rear walls of each of the bags is an amount sufficient to result in a surface tension on the wall of at least about 38 dynes/cm.

(9) In still a further variant, the outer surface of at least one of the front wall and the rear wall of the bags is printed.

(10) In yet a further variant, the first side edges are folded over the second side edges.

(11) In another variant of the invention, the first side edges are folded under the second side edges.

(12) In still another variant, the polyethylene material is formulated from about 40-48 wt. % high density, high molecular weight polyethylene, 12-20 wt. % high density, medium molecular weight polyethylene, 20-30 wt. % linear low density polyethylene, 0-8 wt. % color concentrate.

(13) In a further variant, the polyethylene material is formulated from about 10-20 wt. % recycled material, the recycled material includes about 40-48 wt. % high density, high molecular weight polyethylene, 12-20 wt. % high density, medium molecular weight polyethylene, 20-30 wt. % linear low density polyethylene and 0-8 wt. % color concentrate.

(14) In still a further variant, 10-15 wt. % of the linear low density polyethylene has a density ranging from 0.923-0.924 gm/cc.

(15) In yet a further variant, 10-15 wt. % of the linear low density polyethylene has a melt index ranging from 0.25-0.30 gm/10 minutes.

(16) In another variant of the invention, the high density, medium molecular weight polyethylene has a density ranging from 0.937-0.947 gm/cc.

(17) In still another variant, the high density, medium molecular weight polyethylene has a melt index ranging from 0.10-0.30 gm/10 minutes.

(18) In yet another variant of the invention, a method of making a tri-fold plastic bag roll includes the following steps: Extruding a tube of plastic or other film material. Flattening the tube to form a flattened tube that that has upper and lower surfaces and first and second side edges. Sealing the tube perpendicular to the first and second side edges at predetermined intervals to form bag bottoms. Folding the tube in thirds parallel to the first and second side edges to form a compact flattened tube. Perforating the compact flattened tube perpendicular to the first and second side edges to form a perforation line. Rolling the compact flattened tube into a compact bag roll.

(19) A further variant of the method includes the further step of chisel cutting the compact flattened tube at a center point of the perforation line prior to rolling the compact flattened tube into a compact bag roll.

(20) A still further variant of the method includes the further step of providing a bag roll core prior to rolling the compact flattened tube into a compact bag roll.

(21) Yet a further variant of the method includes the further step of gusseting the tube of film material prior to flattening the tube to form a continuous flattened tube.

(22) Another variant of the method includes the further step of corona treating at least one of the upper and lower surfaces of the continuous flattened tube prior to sealing the tube perpendicular to the first and second side edges.

(23) Still another variant of the method includes the further step of printing either of the upper and lower surfaces of the continuous flattened tube after corona treatment.

(24) In yet another variant of the invention, an apparatus for making a tri-fold bag roll, includes a supply of plastic or other extrudable film material. An extruder is provided. The extruder is capable of forming a seamless continuous tube of thin film from the material. A tubing flattener is provided. The flattener is capable of flattening the continuous tube into a flattened tube. The flattened tube has first and second side edges and upper and lower interior surfaces located adjacent one another. A sealer is provided. The sealer is capable of forming a series of seals in the flattened tube perpendicular to a long axis of the tube. A folder is provided.

The folder includes a platen. The platen has a first end and a second end, is located adjacent the flattened tube and has a width at the second end slightly less than a width of the tri-fold bag. First and second guide bars are provided. The bars guide the first and second side edges of the flattened tube over the platen and the first side edge over the second side edge to form a continuous, compact C-folded flattened tube surrounding the second end of the platen. A perforator is provided. The perforator is capable of perforating the compact flattened tube through six film layers and forming a perforation line. A bag roller is provided. The bag roller is capable of rolling the perforated compact flattened tube into a compact roll.

(25) In a variant of the invention at least one creasing roller is provided. The creasing roller is located adjacent the second end of the platen and bears against the C-folded flattened tube to reinforce folds in the flattened tube.

(26) In still another variant, the apparatus further includes a chisel cutter. The chisel cutter is capable of forming a chisel cut through the six film layers at a center point of the perforation line.

(27) In a further variant, the apparatus includes a supply of cores. The compact flattened tube is wound around the cores to form the compact bag rolls.

(28) In still a further variant, the apparatus includes a gusseter. The gusseter is capable of forming at least one side gusset in the continuous tube prior to flattening.

(29) In yet a further variant, the apparatus includes a corona treater. The corona treater is capable of corona treating at least one of the upper and lower surfaces of the continuous flattened tube prior to folding.

(30) In another variant of the invention, the apparatus includes a printer. The printer is capable of printing on at least one of the upper and lower surfaces of the continuous flattened tube after corona treatment.

(31) In still another variant of the invention, the folder divides the continuous flattened tube into a first side portion, a center portion and a last side portion and folds the first side portion over the center portion and the last side portion over the first side portion, thereby forming a C-fold flattened tube and C-fold bags.

(1) In yet another variant, an apparatus for making a tri-fold bag roll, includes a supply of either of plastic and other extrudable film material. An extruder is provided. The extruder is capable of forming a seamless continuous tube of thin film from the material. A tubing flattener is provided. The flattener is capable of flattening the continuous tube into a flattened tube. The flattened tube has first and second side edges and upper and lower interior surfaces located adjacent one another. A sealer is provided. The sealer is capable of forming a series of seals in the flattened tube perpendicular to a long axis of the tube.

A folder is provided. The folder includes first and second guide bars. The bars guide the first and second side edges of the flattened tube under and over each other to form a continuous, compact Z-folded flattened tube. Each of the guide bars has an outer side and an inner side, an end closer to the extruder and an end further from the extruder. The first guide bar has a wide horizontal platen at the closer end and a first curved portion at the outer side. The first curved portion extends under the platen. The second guide bar has a second curved portion at the closer end and a narrow supporting ledge. The second guide bar is spaced from a first side edge of the first bar with the supporting ledge located below the first side edge of the first bar. The second guide bar transitions to a wider, upper C-shape between the closer end and the further end. The upper C-shape has an upper portion and a lower portion.

The first guide bar transitions to a narrower, lower C-shape between the closer end and the further end. The lower C-shape has an upper portion and a lower portion. The upper portion of the second guide bar is located above the upper portion of the first guide bar. The upper portion of the first guide bar is located above the lower portion of the second guide bar. The lower portion of the second guide bar is located above the lower portion of the first guide bar. The flattened tube is located below a lower surface of the platen and above the supporting ledge at the closer ends of the guide bars and formed into a Z-folded flattened tube at the further ends of the guide bars.

A perforator is provided. The perforator is capable of perforating the compact flattened tube through six film layers and forming a perforation line. A bag roller is provided. The bag roller is capable of rolling the perforated compact flattened tube into a compact roll.

(2) In a further variant, at least one creasing roller is provided. The creasing roller is located downstream from said folder and bears against the Z-folded flattened tube to reinforce folds in the flattened tube.

(3) In still a further variant, a chisel cutter is provided. The chisel cutter is capable of forming a chisel cut through the six film layers at a center point of the perforation line.

(4) In yet a further variant, a supply of cores is provided. The compact bag web is wound around the core to form the compact bag roll.

(5) In another variant of the invention, a gusseter is provided. The gusseter is capable of forming at least one side gusset in the continuous tube prior to flattening.

(6) In still another variant, a corona treater is provided. The corona treater capable of corona treating at least one upper and lower surface of the continuous bag web prior to folding.

(7) In yet another variant, a printer is provided. The printer is capable of printing on at least one of the upper and lower surfaces of the continuous bag web after corona treatment.

(8) In a final variant, the folder divides the continuous flattened tube into a first side portion, a center portion and a last side portion. The folder folds the first side portion over the center portion and the last side portion under the center portion, thereby forming a Z-fold bag web and Z-fold bags.

An appreciation of the other aims and objectives of the present invention and an understanding of it may be achieved by referring to the accompanying drawings and the detailed description of a preferred embodiment.

DESCRIPTION OF THE DRAWINGS

FIG. 1A is a perspective view of the preferred embodiment of the tri-fold plastic bag roll, illustrating a compact bag roll without core;

FIG. 1B is a perspective view of the bag of the FIG. 1A embodiment;

FIG. 2A is a perspective view of the preferred embodiment of the tri-fold plastic bag roll, illustrating a compact bag roll with core;

FIG. 2B is a perspective view of the bag of the FIG. 2A embodiment;

FIG. 5 is a perspective view of the bag of the FIG. 1A embodiment illustrating printing on the outer surface of the bag;

FIG. 6 is a side elevational view of the FIG. 5 embodiment, illustrating the first side edges folded over the second side edges;

FIG. 7 is a side elevational view of the FIG. 5 embodiment, illustrating the first side edges folded under the second side edges;

DETAILED DESCRIPTION OF THE PREFERRED EMBODIMENT (1) FIGS. 1A, 1B, 2A and 2B illustrate a tri-fold plastic bag roll 10 providing the desired features that may be constructed from the following components. A continuous web 15 of plastic bags 20 formed from polyethylene material 22 is provided. Each of the bags 20 includes a front wall 25. The front wall 25 has an inner surface (not shown), an outer surface 35, first 40 and second 45 side edges, a top edge 50 and a bottom edge 55. A rear wall 60 is provided. The rear wall 60 has an inner surface (not shown), an outer surface 70, first 75 and second 80 side edges, a top edge 85 and a bottom edge 90. The front wall 25 is joined to the rear wall 60 at respective first 40, 75 and second 45, 80 side edges thereof. The front wall 25 is sealed to the rear wall 60 adjacent respective bottom edges 55, 90 thereof. An open mouth 95 is located at the top edges 50, 85 of the bag 20.

Figure 3A:
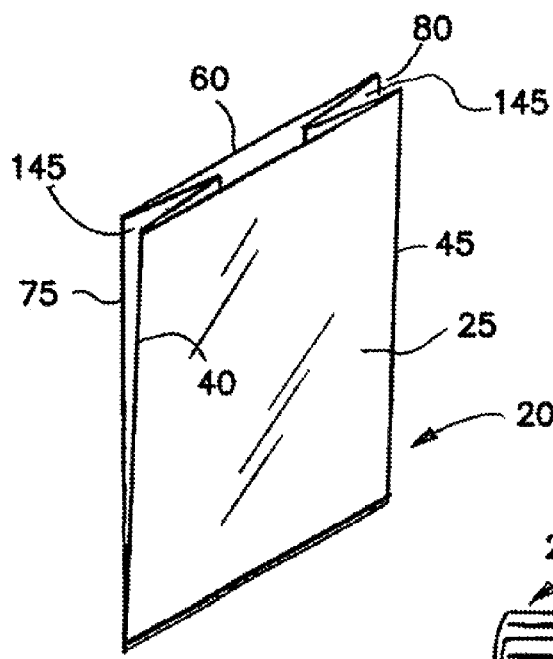
FIG. 3A is a perspective view of an alternative bag of the FIG. 1A embodiment, illustrating gussets approximately one third of the width of the bag.

The front 25 and rear 60 walls of each of the bags 20 are removably attached by a perforation line 100 at the bottom edges 55, 90 to the top edges 50, 85 of a subsequent bag 20 in the web 15. The web 15 is folded twice parallel to a long axis 105 of the bags 20 to form a compact bag web 110 approximately one third of a width 115 of the bags 20. The folded web 110 is rolled to form a compact bag roll 120.

(2) In a variant of the invention, as illustrated in FIGS. 2A and 2B, a chisel cut 125 is provided. The chisel cut 125 extends through a center point 130 of the perforation line 100 of the folded web 110. When the compact roll 120 is installed in a bag dispenser (not shown) the chisel cut 125 will engage a separating tongue (not shown) when bags 20 are pulled from the roll 120. When the bags 20 are opened to their full width 115, three chisel cuts 125 will appear at the perforation line 100.

(3) In a further variant, as illustrated in FIG. 2A the compact web 15 is rolled about a core 135.

(4) In still a further variant, as illustrated in FIGS. 3A, 3B, 4A and 4B, the bags 20 includes at least one side gusset 145, the side gusset 145 extending inwardly from either of the first 40, 75 and second 45, 80 side edges of the front 25 and rear 60 walls.

Figure 3B:
FIG. 3B is a side elevational view of the FIG. 3A embodiment, illustrating the first side edges folded over the second side edges.

(5) In yet a further variant, as illustrated in FIGS. 3A and 3B, the side gusset 145 extends inwardly from either of the first 40, 75 and second 45, 80 side edges of the front 25 and rear 60 walls for up to one third of the width 115 of the bags 20.

Figure 4A:
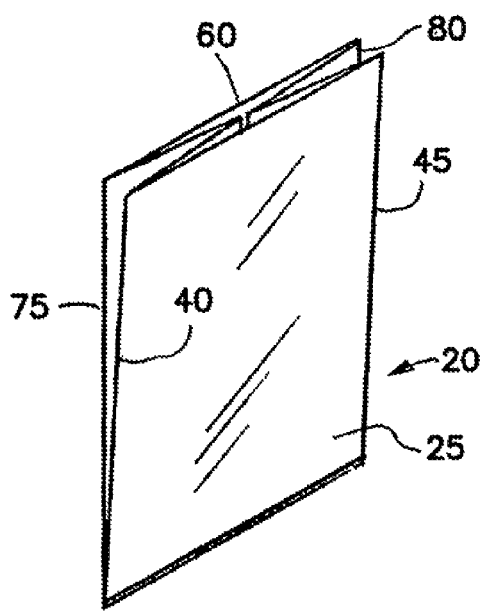
FIG. 4A is a perspective view of an alternative bag of the FIG. 1A embodiment, illustrating gussets approximately one half of the width of the bag.
Figure 4B:
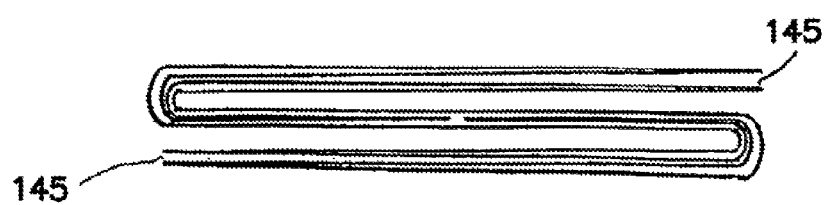
FIG. 4B is a side elevational view of the FIG. 3A embodiment, illustrating the first side edges folded under the second side edges.

(6) In another variant of the invention, as illustrated in FIGS. 4A and 4B, the side gusset 145 extends inwardly from either of the first 40, 75 and second 45, 80 side edges of the front 25 and rear 60 walls for to up one half of the width 115 of the bags 20.

(7) In still another variant, the outer surface 35, 70 of at least one of the front wall 25 and the rear wall 60 of the bags 20 is corona treated.

(8) In a further variant, the corona treatment of the outer surface 35, 70 of at least one of the front 25 and rear 60 walls of each of the bags 20 is an amount sufficient to result in a surface tension on the wall 25, 60 of at least about 38 dynes/cm.

(9) In still a further variant, as illustrated in FIG. 5, the outer surface 35, 70 of at least one of the front wall 25, and the rear wall 60 of the bags 20 is printed.

(10) In yet a further variant, as illustrated in FIG. 6, the first side edges 40, 75 are folded over the second side edges 45, 80.

(11) In another variant of the invention, as illustrated in FIG. 7, the first side edges 40, 75 are folded under the second side edges 45, 80.

(12) In still another variant, the polyethylene material 22 is formulated from about 40-48 wt. % high density, high molecular weight polyethylene, 12-20 wt. % high density, medium molecular weight polyethylene, 20-30 wt. % linear low density polyethylene, 0-8 wt. % color concentrate.

(13) In a further variant, the polyethylene material 22 is formulated from about 10-20 wt. % recycled material, the recycled material includes about 40-48 wt. % high density, high molecular weight polyethylene, 12-20 wt. % high density, medium molecular weight polyethylene, 20-30 wt. % linear low density polyethylene and 0-8 wt. % color concentrate.

(14) In still a further variant, 10-15 wt. % of the linear low density polyethylene has a density ranging from 0.923-0.924 gm/cc.

(15) In yet a further variant, 10-15 wt. % of the linear low density polyethylene has a melt index ranging from 0.25-0.30 gm/10 minutes.

(16) In another variant of the invention, the high density, medium molecular weight polyethylene has a density ranging from 0.937-0.947 gm/cc.

(17) In still another variant, the high density, medium molecular weight polyethylene has a melt index ranging from 0.10-0.30 gm/10 minutes.

Figure 8:
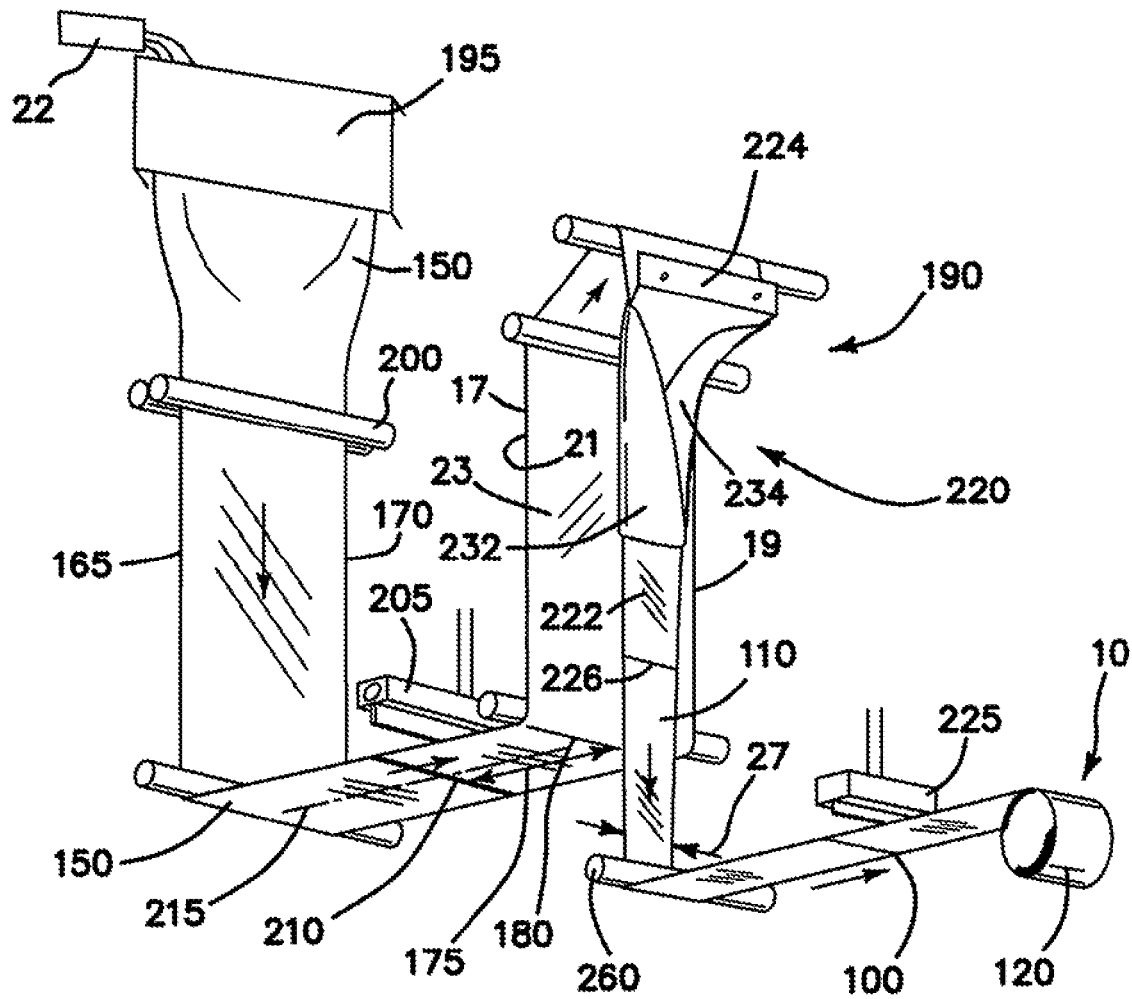
FIG. 8 is a perspective view of an apparatus for forming the compact bag roll of the FIG. 1A embodiment.

(18) In yet another variant of the invention, as illustrated in FIG. 8, a method of making a tri-fold plastic bag roll 10, includes the following steps: Extruding a tube 150 of polyethylene material 22. Flattening the tube 150 to form a continuous web 15 that has upper 155 and lower 160 surfaces and first 165 and second 170 side edges. Sealing the tube 150 perpendicular to the first 165 and second 170 side edges at predetermined intervals 175 to form bag bottoms 180. Folding the web 15 in thirds parallel to the first 165 and second 170 side edges to form a compact web 110. Perforating the compact web 185 perpendicular to the first 165 and second 170 side edges to form a perforation line 100. Rolling the compact web 110 into a compact bag roll 120.

Figure 9:
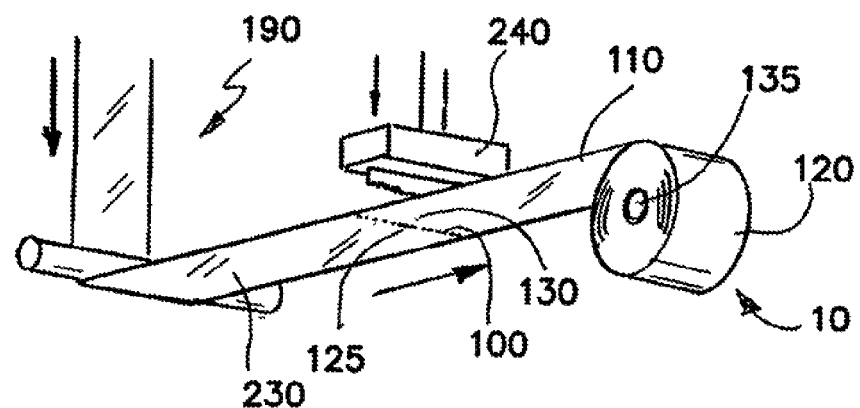
FIG. 9 is a perspective view of perforation of the compact bag roll of the FIG. 2A embodiment.
Figure 11:
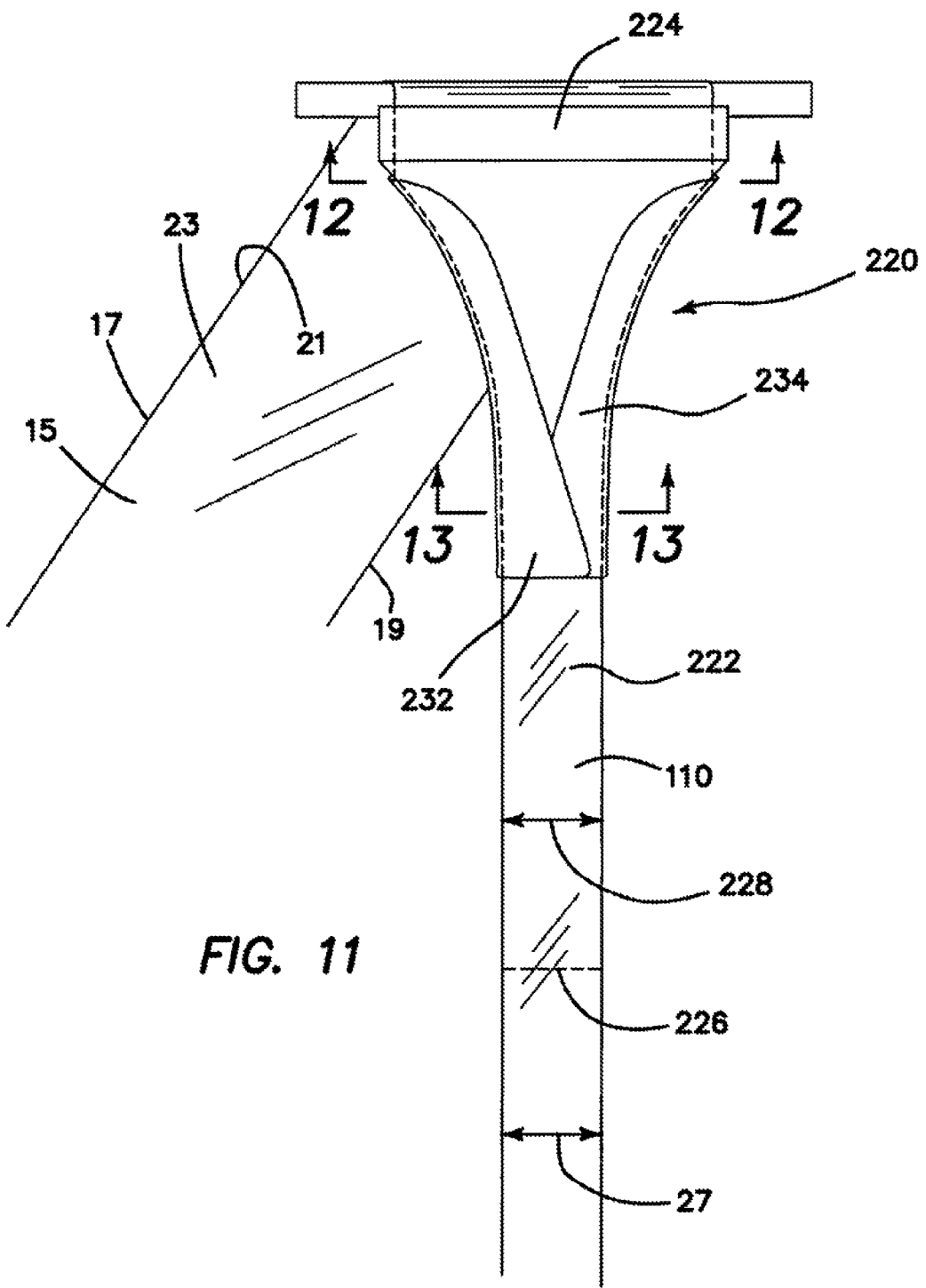
FIG. 11 is a perspective view of the folder of the FIG. 8 apparatus.
Figure 12:
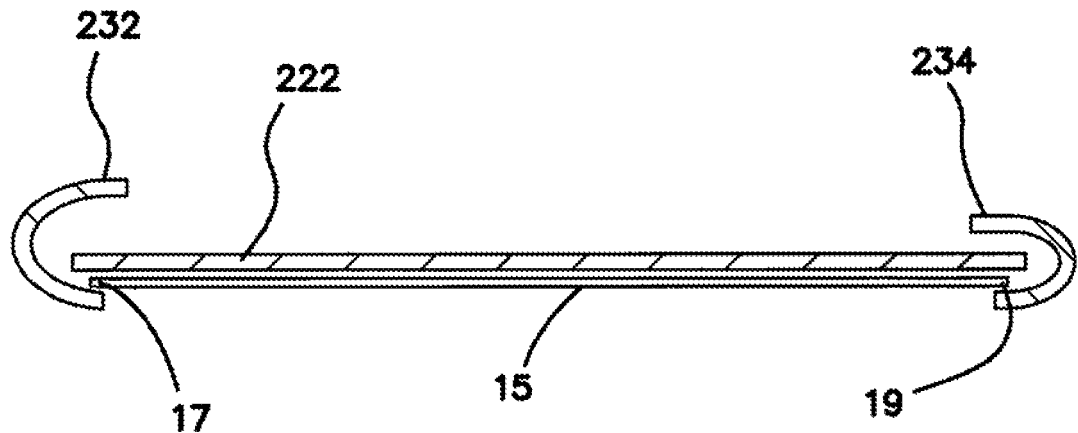
FIG. 12 is a cross-sectional view of the FIG. 11 folder taken along the line 12-12.
Figure 13:
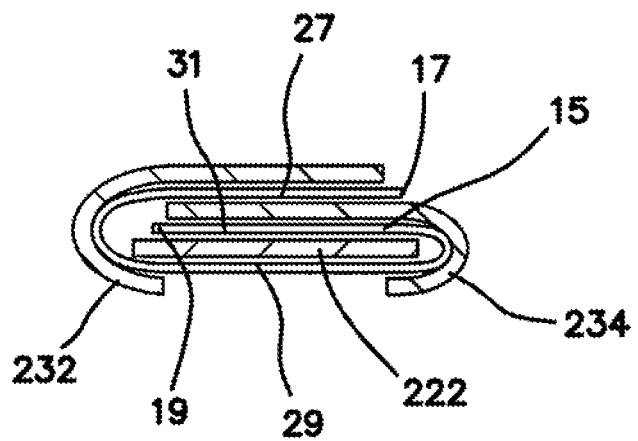
FIG. 13 is a cross-sectional view of the FIG. 11 folder taken along the line 13-13.
Figure 14:
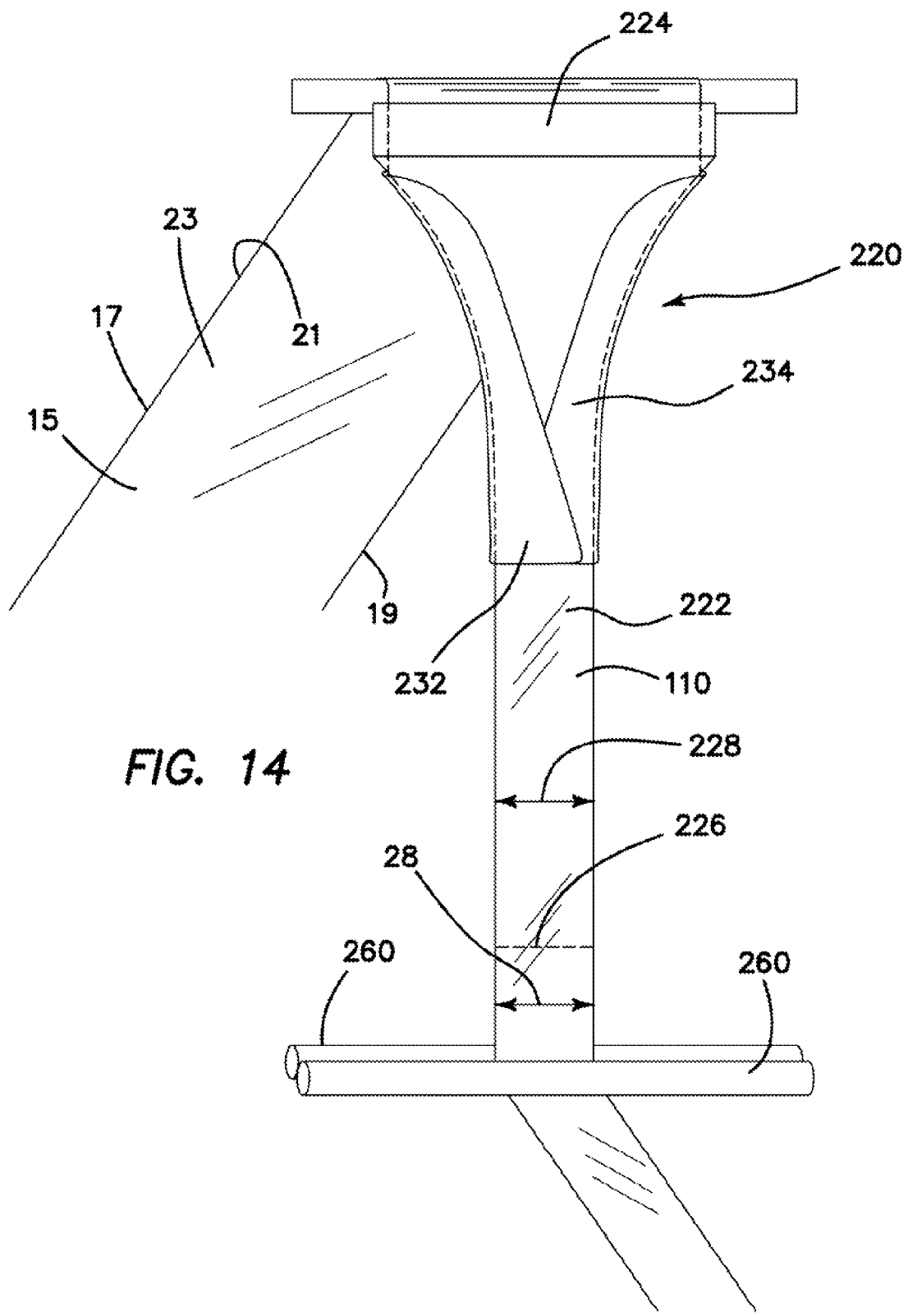
FIG. 14 is a perspective view of the folder of the FIG. 8 apparatus illustrating the creasing rollers.
Figure 15:
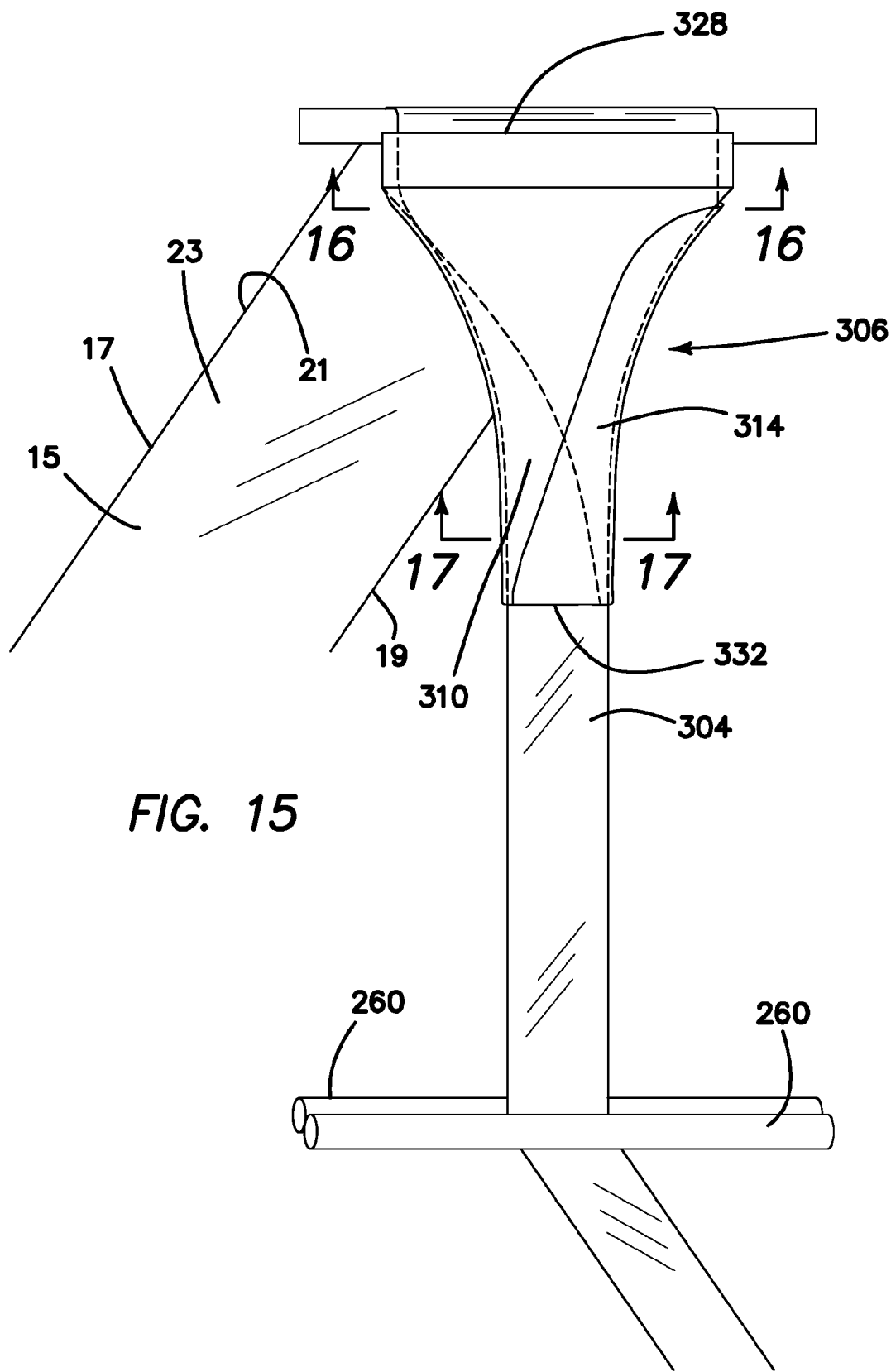
FIG. 15 is a perspective view of a second embodiment of a folder of the FIG. 8 apparatus illustrating the creasing rollers.

(19) A further variant of the method, as illustrated in FIG. 9, includes the further step of chisel cutting the compact web 110 at a center point 130 of the perforation line 100 prior to rolling the compact web 110 into a compact bag roll 120.

(20) A still further variant of the method, as illustrated in FIG. 9, includes the further step of providing a bag roll core 135 prior to rolling the compact web 110 into a compact bag roll 120.

Figure 10:
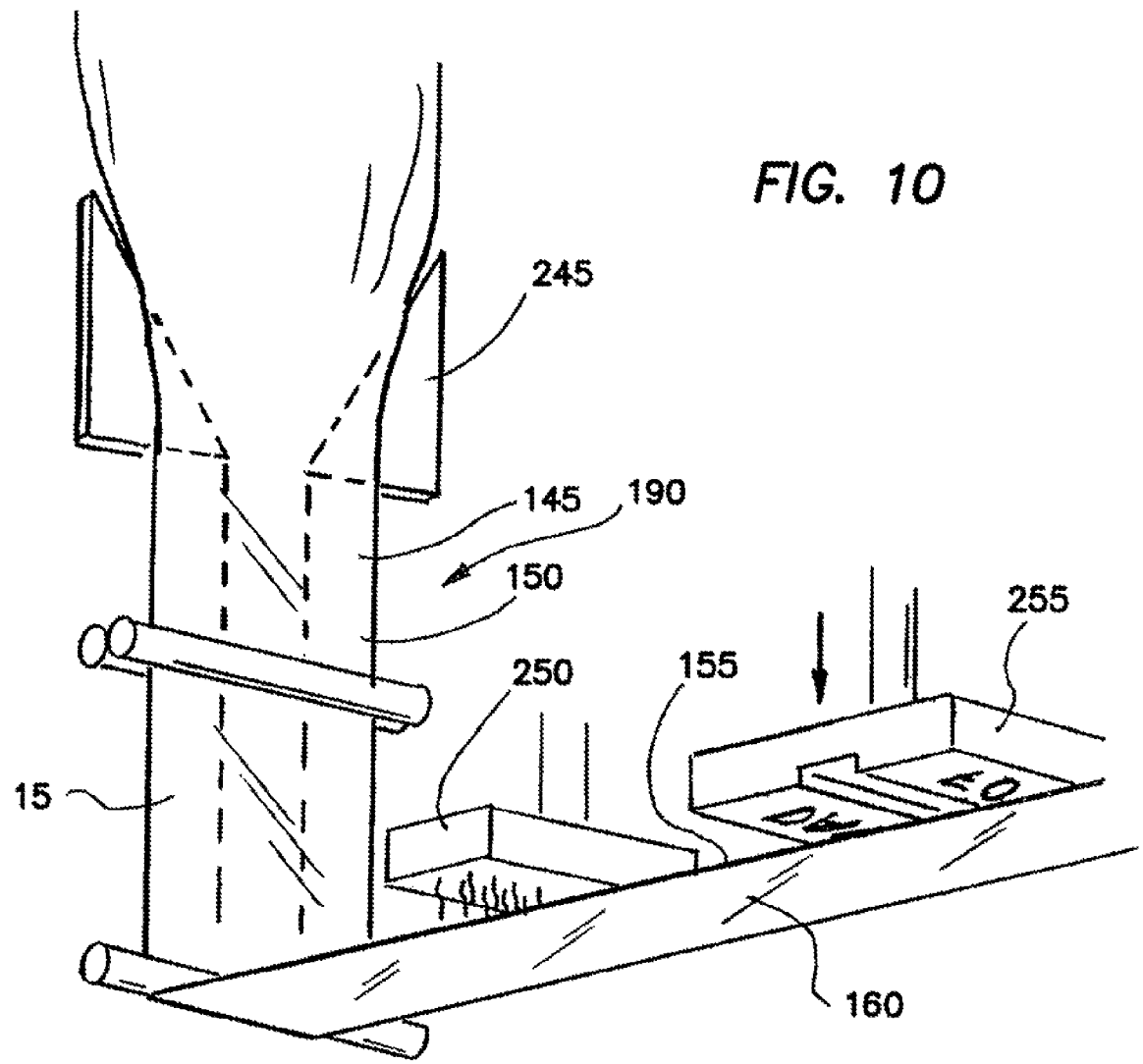
FIG. 10 is a perspective view of an apparatus for gusseting, corona treating and printing the compact bag roll of the FIG. 3A embodiment.

(21) Yet a further variant of the method, as illustrated in FIG. 10, includes the further step of gusseting the tube 150 of polyethylene material 22 prior to flattening the tube 150 to form a continuous web 15.

(22) Another variant of the method, as illustrated in FIG. 10, includes the further step of corona treating at least one of the upper 155 and lower 160 surfaces of the continuous web 15 prior to sealing the tube 150 perpendicular to the first 165 and second 170 side edges.

(23) Still another variant of the method, as illustrated in FIG. 10, includes the further step of printing either of the upper 155 and lower 160 surfaces of the continuous web 15 after corona treatment.

(24) In yet another variant of the invention, as illustrated in FIGS. 8-12, an apparatus 190 for making a tri-fold bag roll 10, includes a supply of plastic or other extrudable film material 22. An extruder 195 is provided. The extruder 195 is capable of forming a seamless continuous tube of thin film 150 from the material 22. A tubing flattener 200 is provided. The flattener 200 is capable of flattening the continuous tube 150 into a flattened tube 15. The flattened tube 15 has first 17 and second 19 side edges and upper 21 and lower 23 interior surfaces located adjacent one another. A sealer 205 is provided. The sealer 205 is capable of forming a series of seals 210 in the flattened tube 15 perpendicular to a long axis 215 of the tube 15.

A folder 220 is provided. The folder 220 includes a platen 222. The platen 222 has a first end 224 and a second end 226, is located adjacent the flattened tube 15 and has a width 228 at the second end 226 slightly less than a width 27 of the tri-fold bag 10. First 232 and second 234 guide bars are provided. The bars 232, 234 guide the first 17 and second 19 side edges of the flattened tube 15 over the platen 222 and the first side edge 17 over the second side edge 19 to form a continuous, compact C-folded flattened tube 110 surrounding the second end 226 of the platen 222. A perforator 225 is provided. The perforator 225 is capable of perforating the compact flattened tube 110 through six film layers 230 and forming a perforation line 100. A bag roller (not shown) is provided. The bag roller is capable of rolling the perforated compact flattened tube 110 into a compact roll 120.

(25) In a variant of the invention at least one creasing roller 260 is provided. The creasing roller 260 is located adjacent the second end 226 of the platen 222 and bears against the C-folded flattened tube 110 to reinforce folds 265 in the flattened tube 110.

(26) In still another variant, as illustrated in FIG. 9, the apparatus 190 further includes a chisel cutter 240. The chisel cutter 240 is capable of forming a chisel cut 125 through the six film layers 230 at a center point 130 of the perforation line 100.

(27) In a further variant, as illustrated in FIG. 9, the apparatus 190 includes a supply of cores 135. The compact bag web 110 is wound around the cores 135 to form the compact bag rolls 120.

(28) In still a further variant, as illustrated in FIG. 10, the apparatus 190 includes a gusseter 245. The gusseter 245 is capable of forming at least one side gusset 145 in the continuous tube 150 prior to flattening.

(29) In yet a further variant, as illustrated in FIG. 10, the apparatus 190 includes a corona treater 250. The corona treater 250 is capable of corona treating at least one of the upper and lower surfaces 155, 160 of the continuous bag web 15 prior to folding.

(30) In another variant of the invention, as illustrated in FIG. 10, the apparatus 190 includes a printer 255. The printer 255 is capable of printing on at least one of the upper and lower 155, 160 surfaces of the continuous bag web 15 after corona treatment.

(31) In a final variant of the invention, the folder 220 divides the continuous flattened tube 15 into a first side portion 27, a center portion 29 and a last side portion 31 and folds the first side portion 27 over the center portion 29 and the last side portion 31 over the first side portion 27, thereby forming a C-fold flattened tube 110 and C-fold bags 20.

(1) In yet another variant, as illustrated in FIGS. 8 and 15-17 an apparatus 190 for making a tri-fold bag roll 10, includes a supply of either of plastic and other extrudable film material 22. An extruder 195 is provided. The extruder 195 is capable of forming a seamless continuous tube of thin film 150 from the material 22. A tubing flattener 200 is provided. The flattener 200 is capable of flattening the continuous tube 150 into a flattened tube 15. The flattened tube 15 has first 17 and second 19 side edges and upper 21 and lower 23 interior surfaces located adjacent one another. A sealer 205 is provided. The sealer 205 is capable of forming a series of seals 210 in the flattened tube 15 perpendicular to a long axis 215 of the tube 15. A folder 306 is provided. The folder 306 includes first 310 and second 314 guide bars. The bars 310, 314 guide the first 17 and second 19 side edges of the flattened tube 15 under and over each other to form a continuous, compact Z-folded flattened tube 304.

Each of the guide bars 310, 314 has an outer side 312, 316 and an inner side 320, 324, an end closer 328 to the extruder 195 and an end further 332 from the extruder 195. The first guide bar 310 has a wide horizontal platen 336 at the closer end 328 and a first curved portion 340 at the outer side 312. The first curved portion 340 extends under the platen 336. The second guide bar 314 has a second curved portion 344 at the closer end 328 and a narrow supporting ledge 348. The second guide bar 314 is spaced from a first side edge 352 of the first bar 310 with the supporting ledge 348 located below the first side edge 352 of the first bar 310. The second guide bar 314 transitions to a wider, upper C-shape 356 between the closer end 328 and the further end 332. The upper C-shape 356 has an upper portion 360 and a lower portion 364.

The first guide bar 310 transitions to a narrower, lower C-shape 368 between the closer end 328 and the further end 332. The lower C-shape 368 has an upper portion 372 and a lower portion 376. The upper portion 360 of the second guide bar 314 is located above the upper portion 372 of the first guide bar 310. The upper portion 372 of the first guide bar 310 is located above the lower portion 364 of the second guide bar 314. The lower portion 364 of the second guide bar 314 is located above the lower portion 376 of the first guide bar 310. The flattened tube 15 is located below a lower surface 380 of the platen 336 and above the supporting ledge 348 at the closer ends 328 of the guide bars 310, 314 and formed into a Z-folded flattened tube 304 at the further ends 332 of the guide bars 310, 314.

A perforator 225 is provided. The perforator 225 is capable of perforating the compact flattened tube 110 through six film layers 230 and forming a perforation line 100. A bag roller (not shown) is provided. The bag roller is capable of rolling the perforated compact flattened tube 304 into a compact roll 120.

(2) In a further variant, at least one creasing roller 260 is provided. The creasing roller 260 is located downstream from said folder 306 and bears against the Z-folded flattened tube 304 to reinforce folds 308 in the flattened tube 304.

(3) In still a further variant, as illustrated in FIG. 9, the apparatus 190 further includes a chisel cutter 240. The chisel cutter 240 is capable of forming a chisel cut 125 through the six film layers 230 at a center point 130 of the perforation line 100.

(4) In yet a further variant, as illustrated in FIG. 9, the apparatus 190 includes a supply of cores 135. The compact Z-folded flattened tube 304 is wound around the cores 135 to form the compact bag rolls 120.

(5) In another variant of the invention, as illustrated in FIG. 10, the apparatus 190 includes a gusseter 245. The gusseter 245 is capable of forming at least one side gusset 145 in the continuous tube 150 prior to flattening.

(6) In still another variant, as illustrated in FIG. 10, the apparatus 190 includes a corona treater 250. The corona treater 250 is capable of corona treating at least one of the upper and lower surfaces 155, 160 of the continuous bag web 15 prior to folding.

(7) In yet another variant, as illustrated in FIG. 10, the apparatus 190 includes a printer 255. The printer 255 is capable of printing on at least one of the upper and lower 155, 160 surfaces of the continuous bag web 15 after corona treatment.

Figure 16:
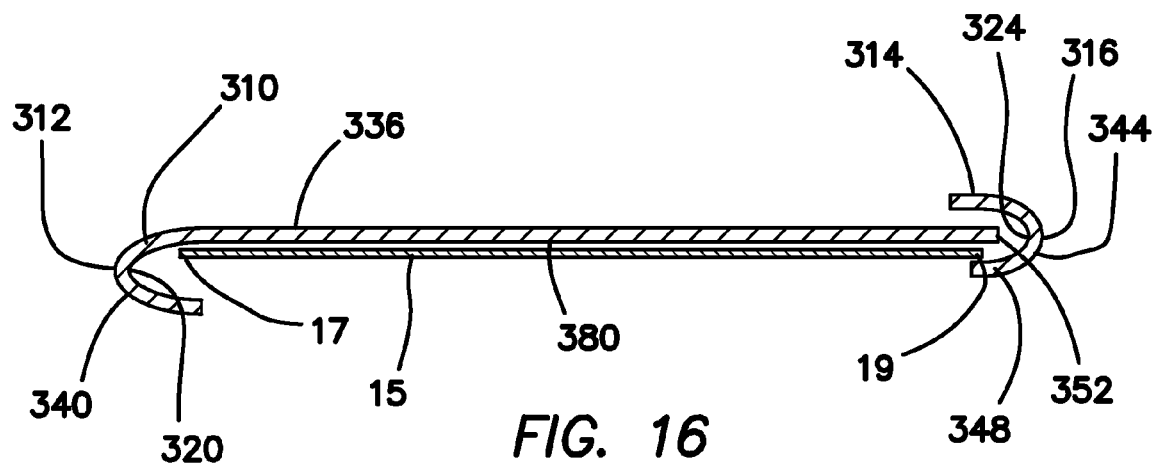
FIG. 16 is a cross-sectional view of the FIG. 15 folder taken along the line 16-16.
Figure 17:
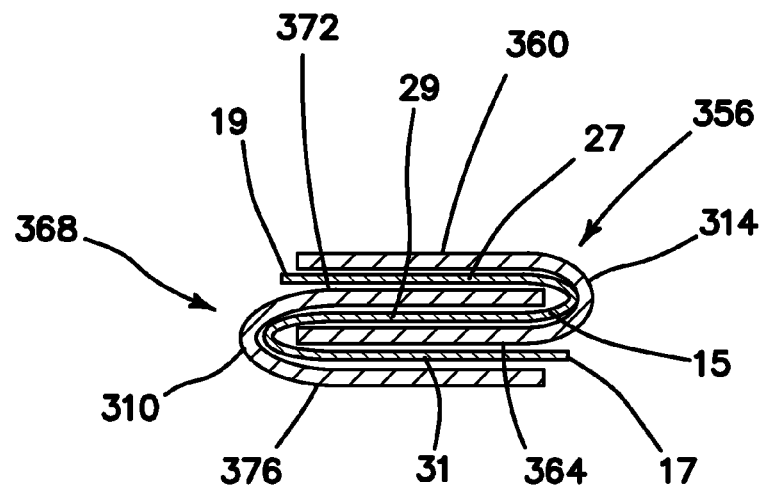
FIG. 17 is a cross-sectional view of the FIG. 15 folder taken along the line 17-17.

(8) In a final variant, as illustrated in FIGS. 16 and 17, the folder divides the continuous flattened tube 15 into a first side portion 27, a center portion 29 and a last side portion 31. The folder 306 folds the first side portion 27 over the center portion 29 and the last side portion 31 under the center portion 29, thereby forming a Z-fold bag web 304 and Z-fold bags 318.

The tri-fold plastic bag roll 10 and apparatus 190 for making same have been described with reference to particular embodiments. Other modifications and enhancements can be made without departing from the spirit and scope of the claims that follow.

The invention claimed is:

1. An apparatus for making a roll of tri-fold bottom seamed bags, comprising:
   a supply of either of plastic and other extrudable film material;
   an extruder, said extruder forming a seamless continuous tube of thin film from said material;
   a tubing flattener, said flattener flattening said continuous tube into a flattened tube, said flattened tube having first and second side edges and upper and lower interior surfaces disposed adjacent one another;
   a sealer, said sealer forming a series of seals in said flattened tube perpendicular to a long axis of said tube said seals forming bottom seams for bags of said roll of tri-fold bottom seamed bags;
   a folder, said folder comprising:
      first and second curved guide bars, said curved guide bars guiding said first and second side edges of said flattened tube under and over each other to form a continuous, compact Z-folded flattened tube;
      each of said curved guide bars having an outer side and an inner side, an end closer to said extruder and an end further from said extruder, said first curved guide bar having a wide horizontal platen at said closer end and a first curved portion at said outer side, said first curved portion extending under said platen;
      said second curved guide bar having a second curved portion at said closer end and a narrow supporting ledge;
      said second curved guide bar being spaced from a first side edge of said first curved guide bar with said narrow supporting ledge disposed below said first side edge of said first curved guide bar;
      said second curved guide bar transitioning to a wider, upper C-shape between said closer end and said further end, said upper C-shape having an upper portion and a lower portion;
      said first curved guide bar transitioning to a narrower, lower C-shape between said closer end and said further end, said narrower, lower C-shape having an upper portion and a lower portion;
      said first and second side edges of said flattened tube being disposed between said wider, upper C-shape of said second curved guide bar and said narrower, lower C-shape of said first curved guide bar;
      said first and second curved guide bars forming a Z-shaped configuration at said further ends;
      said upper portion of said second curved guide bar disposed above said upper portion of said first curved guide bar;
      said upper portion of said first curved guide bar disposed above said lower portion of said second curved guide bar;
      said lower portion of said second curved guide bar disposed above said lower portion of said first curved guide bar;
      said flattened tube disposed below a lower surface of said platen and above said narrow supporting ledge at said closer ends of said first and second curved guide bars and formed into a Z-folded flattened tube at said further ends of said first and second curved guide bars;
   a perforator, said perforator perforating said compact, Z-folded flattened tube through six film layers and forming a perforation line; and
   a bag roller, said bag roller rolling said perforated compact flattened tube into a compact roll.

2. The apparatus for making a roll of tri-fold bottom seamed bags, as described in claim 1, further comprising at least one creasing roller, said creasing roller disposed downstream from said folder and bearing against said Z-folded flattened tube to reinforce folds in said flattened tube.

3. The apparatus for making a roll of tri-fold bottom seamed bags, as described in claim 1, further comprising a chisel cutter, said chisel cutter forming a chisel cut through said six film layers at a center point of said perforation line.

4. The apparatus for making a roll of tri-fold bottom seamed bags, as described in claim 1, further comprising a supply of cores, said compact bag web being wound around said core to form said compact bag roll.

5. The apparatus for making a roll of tri-fold bottom seamed bags, as described in claim 1, further comprising a gusseter, said gusseter forming at least one side gusset in said continuous tube prior to flattening.

6. The apparatus for making a roll of tri-fold bottom seamed bags, described in claim 1, further comprising a corona treater, said corona treater corona treating at least one upper and lower surface of said continuous bag web prior to folding.

7. The apparatus for making a roll of tri-fold bottom seamed bags, as described in claim 6, further comprising a printer, said printer printing on at least one of said upper and lower surfaces of said continuous bag web after corona treatment.

8. The apparatus for making a roll of tri-fold bottom seamed bags, as described in claim 1, wherein said folder divides said continuous flattened tube into a first side portion, a center portion and a last side portion and folds said first side portion over said center portion and said last side portion under said center portion, thereby forming a Z-fold bag web and Z-fold bags.

* * * * *